United States Patent
Kodama (10) Patent No.: US 11,380,941 B2
(45) Date of Patent: Jul. 5, 2022

(54) BATTERY INFORMATION PROCESSING SYSTEM, BATTERY ASSEMBLY, METHOD OF CALCULATING CAPACITY OF BATTERY MODULE, AND METHOD OF MANUFACTURING BATTERY ASSEMBLY

(71) Applicant: TOYOTA JIDOSHA KABUSHIKI KAISHA, Toyota (JP)

(72) Inventor: Kazuya Kodama, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 16/377,756

(22) Filed: Apr. 8, 2019

(65) Prior Publication Data

US 2019/0334213 A1    Oct. 31, 2019

(30) Foreign Application Priority Data

Apr. 26, 2018 (JP) .............................. JP2018-084933

(51) Int. Cl.
*H01M 10/42* (2006.01)
*H01M 10/48* (2006.01)
(Continued)

(52) U.S. Cl.
CPC .......... *H01M 10/425* (2013.01); *B60L 50/66* (2019.02); *B60L 58/12* (2019.02); *H01M 10/48* (2013.01);
(Continued)

(58) Field of Classification Search
CPC .............. H01M 10/48; H01M 10/425; H01M 2010/4271; H01M 10/482; H01M 10/42;
(Continued)

(56) References Cited

U.S. PATENT DOCUMENTS

| | | | |
|---|---|---|---|
| 7,576,545 B2* | 8/2009 | Singh | H01M 10/48 324/427 |
| 2012/0019253 A1* | 1/2012 | Ziegler | G01R 31/392 324/433 |
| 2017/0219660 A1 | 8/2017 | Christensen et al. | |

FOREIGN PATENT DOCUMENTS

| | | |
|---|---|---|
| CN | 107076801 A1 | 8/2017 |
| JP | 2003-317810 A | 11/2003 |

OTHER PUBLICATIONS

Yang et al., "Optimization and Application of Operation Range for LiFePO$_4$ Battery", Appliance and Energy Efficiency Management Technology, PN 191019, No. 10, pp. 60-66, Oct. 2014 (7 pages total).

(Continued)

*Primary Examiner* — Anthony R Jimenez
(74) *Attorney, Agent, or Firm* — Sughrue Mion, PLLC (57) ABSTRACT

A battery information processing system includes a control device configured to perform capacity calculation processing. The capacity calculation processing is processing for calculating a full charge capacity Q of the module based on a fitting curve Z calculated by fitting processing of a Nyquist plot representing a result of measurement of an AC impedance of the module. In an OCV-SOC curve of the module, there are a flat region in which a ratio of variation is lower than a reference value and a steep region in which the ratio of variation is higher than the reference value. The control device estimates an OCV of the module from a result of detection by a voltage sensor and performs the capacity calculation processing when the estimated OCV is in the flat region.

7 Claims, 9 Drawing Sheets

(51) Int. Cl.
*B60L 58/12* (2019.01)
*B60L 50/60* (2019.01)
*H02J 7/00* (2006.01)

(52) U.S. Cl.
CPC ...... *H02J 7/0047* (2013.01); *H02J 7/007184* (2020.01); *H01M 2010/4271* (2013.01); *H02J 7/0049* (2020.01)

(58) Field of Classification Search
CPC ........... H01M 10/4207; H01M 10/4257; H02J 7/007184; H02J 7/0047; H02J 7/0049; H02J 7/0021; H02J 7/027; H02J 7/1461; H02J 7/166; H02J 7/0048; H02J 7/005; B60L 50/66; B60L 58/12; G01R 31/00; G01R 31/36; G01R 31/3646; G01R 31/3647; G01R 31/3648; G01R 31/367; G01R 31/379; G01R 31/382; G01R 31/3832; G01R 31/385; G01R 31/387; G01R 31/389; G01R 31/392

USPC ......................................................... 701/22
See application file for complete search history.

(56) References Cited

OTHER PUBLICATIONS

English translation of the relevant portion in the Chinese Office Action dated Feb. 1, 2021 from the China National Intellectual Property Administration in Application No. 201910327295.6.
Partial English Translation of Chinese Office Action dated Jun. 3, 2021 from the China National Intellectual Property Administration in Application No. 201910327295.6.
Yang De Cai, "Safety of Lithium Ion Battery-Principles, Design, and Test," first edition, University of Electronic Science and Technology of China Press, May 2012, pp. 147-150 (5 pages).

* cited by examiner

| SIGN | MODEL PARAMETER |
| --- | --- |
| L | JUNCTION INDUCTANCE |
| R | JUNCTION RESISTANCE |
| Rsol | SOLUTION RESISTANCE |
| Rct | CHARGE TRANSFER RESISTANCE |
| p1 | CPE INDEX OF DIFFUSION RESISTANCE |
| T1 | CPE CONSTANT OF DIFFUSION RESISTANCE |
| p2 | CPE INDEX OF ELECTRIC DOUBLE LAYER CAPACITANCE |
| T2 | CPE CONSTANT OF ELECTRIC DOUBLE LAYER CAPACITANCE |

BATTERY INFORMATION PROCESSING SYSTEM, BATTERY ASSEMBLY, METHOD OF CALCULATING CAPACITY OF BATTERY MODULE, AND METHOD OF MANUFACTURING BATTERY ASSEMBLY

This nonprovisional application is based on Japanese Patent Application No. 2018-084933 filed with the Japan Patent Office on Apr. 26, 2018, the entire contents of which are hereby incorporated by reference.

BACKGROUND

Field

The present disclosure relates to a battery information processing system, a battery assembly, a method of calculating a capacity of a battery module, and a method of manufacturing a battery assembly, and more particularly to a technique for calculating a full charge capacity of a battery module including a plurality of nickel metal hydride batteries.

Description of the Background Art

Electrically powered vehicles incorporating battery assemblies (hybrid vehicles or electric vehicles) have increasingly been used in recent years. Battery assemblies mounted on vehicles are collected on the occasion of replacement purchase of these electrically powered vehicles. The number of collected battery assemblies is expected to rapidly increase in the future.

In general, a battery assembly may deteriorate with lapse of time or with repeated charging and/or discharging, and a degree of progress of deterioration is different for each collected battery assembly. Therefore, it has been required to evaluate characteristics of the collected battery assemblies (diagnose a degree of progress of deterioration) and perform appropriate processing for recycling the battery assemblies in accordance with results of evaluation.

An alternating-current (AC) impedance measurement method has been known as an approach to evaluation of characteristics of a secondary battery. For example, Japanese Patent Laying-Open No. 2003-317810 discloses a method of determining whether or not minor short-circuiting has occurred in a secondary battery based on a reaction resistance value of the secondary battery obtained by the AC impedance measurement method.

SUMMARY

In general, a battery assembly to be mounted on a vehicle includes a plurality of battery modules and each of the plurality of battery modules includes a plurality of secondary batteries (cells). In evaluating characteristics of such a battery assembly, a procedure as below may be performed. A plurality of battery modules are taken out of a collected battery assembly and an AC impedance of each battery module is measured. A manner of recycle (which may be whether or not the battery module is recyclable) is determined for each battery module based on a result of measurement of the AC impedance.

In the AC impedance measurement method, an AC signal at a frequency within a prescribed range is successively applied to a battery module and a response signal from the battery module at that time is measured. A real number component and an imaginary number component of an impedance of the battery module are calculated from the applied AC signal (an application signal) and the measured response signal, and results of calculation are discretely plotted on a complex plane. This complex impedance plot is also called a Nyquist plot. By analyzing the Nyquist plot, characteristics of the battery module can be evaluated.

A full charge capacity of a battery module is a representative characteristic of a battery module which can be evaluated by this analysis approach and relates to recycle. For example, when a full charge capacity of a battery module is not lower than a criterion value, the battery module can be determined as recyclable (rebuildable), and when the full charge capacity of the battery module is lower than the criterion value, the battery module can be determined as non-recyclable (to be passed to material recycling).

A full charge capacity of a battery module can be calculated, for example, also by discharging a battery module in a fully charged state (in a state at a state of charge (SOC) =100%) to a completely discharged state (in a state at SOC=0%). Alternatively, in contrast, a battery module may be charged from the completely discharged state to the fully charged state. Though a full charge capacity can highly accurately be calculated by this approach, a long period of time may be required for charging and/or discharging of a battery module. Therefore, in a scenario in which a full charge capacity of a large number of battery modules should be calculated, there is a room for improvement in length of required time.

In contrast, the analysis approach described previously can obviate the need for charging and/or discharging (significant charging and/or discharging) of a secondary battery and hence required time can be shortened. In using this analysis approach, on the other hand, improvement in accuracy in calculation of the full charge capacity of the battery module is required. When a full charge capacity can highly accurately be calculated, a manner of recycle (recyclability) of that battery module can also highly accurately be determined.

The present disclosure was made to solve the problems above, and an object thereof is to provide a technique allowing highly accurate calculation of a full charge capacity of a battery module based on a result of measurement of an AC impedance of the battery module.

(1) A battery information processing system according to one aspect of the present disclosure is a system which processes information for calculating a full charge capacity of a battery module including a plurality of nickel metal hydride batteries.

The battery information processing system includes a voltage sensor configured to detect a voltage of the battery module and a controller configured to perform capacity calculation processing for calculating a full charge capacity of the battery module. The capacity calculation processing is processing for calculating a full charge capacity of the battery module based on a fitting curve calculated by fitting processing of a Nyquist plot representing a result of measurement of an AC impedance of the battery module. There are a flat region and a steep region in an OCV-SOC curve of the battery module. A ratio of variation represents an amount of increase in open circuit voltage (OCV) with respect to an amount of increase in SOC of the battery module, and the ratio in the flat region is lower than a reference value and the ratio in the steep region is higher than the reference value. The controller estimates an OCV of the battery module from a result of detection by the voltage sensor and performs the capacity calculation processing when the estimated OCV is in the flat region.

(2) Preferably, the battery information processing system further includes a storage device configured to store correlation between a feature value which can be extracted from the fitting curve and the full charge capacity. The controller performs processing for extracting the feature value from the fitting curve and calculating the full charge capacity from the extracted feature value by referring to the correlation.

According to the features in (1) and (2), capacity calculation processing is performed while an OCV of a battery module is in the flat region. Though details will be described later, when the OCV of the battery module is in the flat region, an AC impedance of the battery module is hardly varied regardless of the OCV. Therefore, even though an OCV of battery modules subjected to measurement of an AC impedance is various in value, a result of measurement of the AC impedance not dependent on the OCV can be obtained. In other words, variation in result of measurement of the AC impedance due to a difference in OCV of the battery module can be lessened. Therefore, a full charge capacity of the battery module can highly accurately be estimated.

(3) Preferably, the battery information processing system further includes a power converter configured to charge and/or discharge the battery module. The controller performs the capacity calculation processing by controlling the power converter such that the OCV of the battery module is within the flat region when the OCV estimated from the result of detection by the voltage sensor is in the steep region. According to the features in (3), even though the OCV is in the steep region, capacity calculation processing in which a full charge capacity can highly accurately be calculated can be performed by accommodating the OCV in the flat region.

(4) A battery assembly according to another aspect of the present disclosure includes a plurality of battery modules of which full charge capacity has been calculated by the battery information processing system described above.

According to the feature in (4), a battery assembly is constituted of battery modules of which full charge capacity has highly accurately been calculated by the features in (1) to (3). Therefore, for example, a battery assembly less in variation in full charge capacity among battery modules can be provided.

(5) A battery module capacity calculation method according to yet another aspect of the present disclosure calculates a full charge capacity of a battery module including a plurality of nickel metal hydride batteries. There are a flat region and a steep region in an OCV-SOC curve of the battery module. A ratio of variation represents an amount of increase in OCV with respect to an amount of increase in SOC of the battery module, and the ratio in the flat region is lower than a reference value and the ratio in the steep region is higher than the reference value. The battery module capacity calculation method includes estimating an OCV of the battery module from a result of detection by a voltage sensor, obtaining a Nyquist plot representing a result of measurement of an AC impedance of the battery module, and calculating a full charge capacity of the battery module based on a fitting curve calculated by fitting processing of the Nyquist plot when the OCV of the battery module estimated in the estimating an OCV is in the flat region.

According to the method in (5), as in the features in (1), a full charge capacity of a battery module can highly accurately be calculated by appropriately analyzing a result of measurement of an AC impedance of the battery module.

(6) A method of manufacturing a battery assembly according to yet another aspect of the present disclosure includes first to fourth steps. In an OCV-SOC curve of a battery module including a plurality of nickel metal hydride batteries, there are a flat region and a steep region. A ratio of variation represents an amount of increase in OCV with respect to an amount of increase in SOC of the battery module, and the ratio in the flat region is lower than a reference value and the ratio in the steep region is higher than the reference value. The first step is a step of estimating an OCV of the battery module from a result of detection by a voltage sensor. The second step is a step of obtaining a Nyquist plot representing a result of measurement of an AC impedance of the battery module. The third step is a step of calculating a full charge capacity of the battery module based on a fitting curve calculated by fitting processing of the Nyquist plot when the OCV of the battery module estimated in the estimating an OCV (the first step) is in the flat region. The fourth step is a step of manufacturing a battery assembly from a plurality of battery modules of which full charge capacity has been calculated in the calculating a full charge capacity (the third step).

According to the manufacturing method in (6), as in the feature in (4), a battery assembly can be manufactured from a battery module of which full charge capacity has highly accurately been calculated.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described below in detail with reference to the drawings.

The same or corresponding elements in the drawings have the same reference characters allotted and description thereof will not be repeated.

In the present disclosure, a battery assembly includes a plurality of battery modules (a battery module being abbreviated as a "module" below). The plurality of modules may be connected in series or in parallel. Each of the plurality of modules includes a plurality of secondary batteries (a secondary battery being denoted as a "cell" below) connected in series.

"Manufacturing" of a battery assembly in the present disclosure means manufacturing of a battery assembly by replacing at least one of a plurality of modules included in a battery assembly with other modules (replacement modules). Though the replacement module is basically a recyclable module taken out of a collected battery assembly, it may be a new module.

In general, "recycle" of a battery assembly is broadly categorized into reuse, rebuild, and resource recycle. In the case of reuse, collected battery assemblies are subjected to necessary shipment inspection and shipped as they are as reuse products. In the case of rebuild, collected battery assemblies are once disassembled to modules (which may be cells). Then, among the disassembled modules, modules which can be used after reconditioning (which may be modules which can be used as they are) are combined to manufacture a new battery assembly. Newly manufactured battery assemblies are subjected to shipment inspection and shipped as rebuilt products. In contrast, in resource recycle (material recycle), renewable materials are taken out of each module (each cell) and collected battery assemblies are not used as other battery assemblies.

In the embodiment described below, a battery assembly collected from a vehicle is once disassembled into modules and a performance test is conducted for each module. A battery assembly is manufactured from modules determined as being recyclable as a result of the performance test. Therefore, a recyclable module means a rebuildable module below. Depending on a configuration of a battery assembly, however, a battery assembly as it is can also be subjected to the performance test without being disassembled into modules. "Recycle" in such a case may encompass both of reuse and rebuild.

In the present embodiment, each cell is implemented by a nickel metal hydride battery. More specifically, a positive electrode is composed of nickel hydroxide ($Ni(OH)_2$) to which a cobalt oxide additive is added. A negative electrode is composed of a hydrogen storage alloy (based on MnNi5 which represents a nickel-based alloy). An electrolyte solution is composed of potassium hydroxide (KOH). These, however, are merely by way of example of a specific cell configuration, and a cell configuration to which the present disclosure is applicable is not limited thereto.

Embodiment

<Battery Distribution Model>

Figure 1:
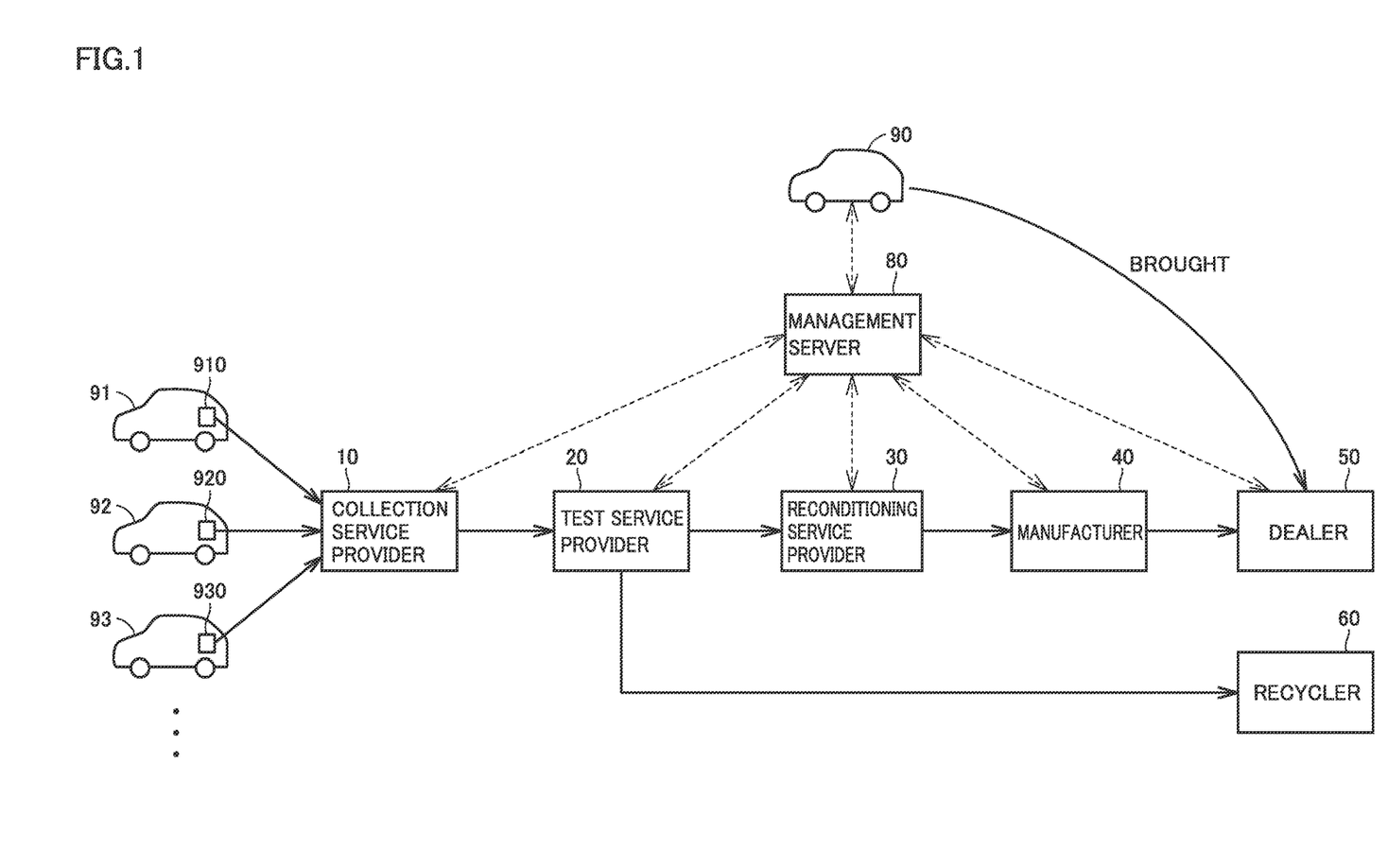
FIG. 1 is a diagram showing one manner of distribution from collection to manufacturing and sales of battery assemblies in the present embodiment.
Figure 2:
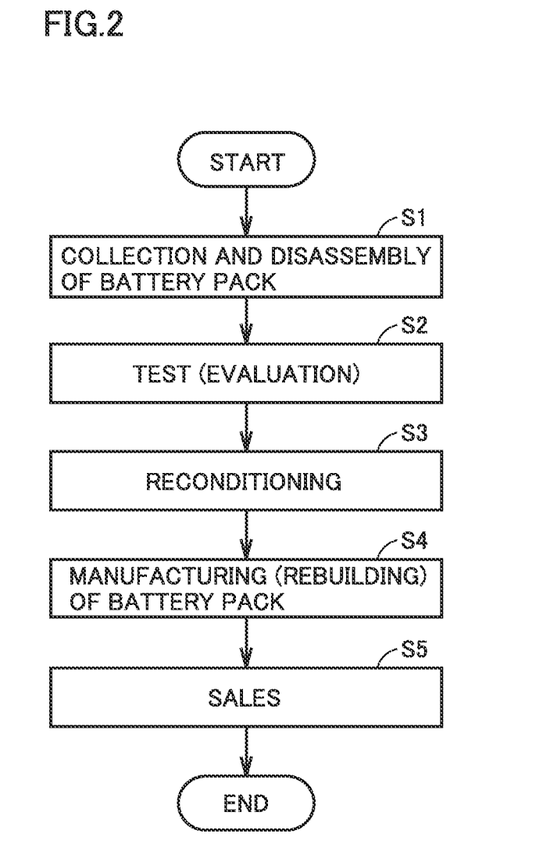
FIG. 2 is a flowchart showing a flow of processing in a battery distribution model shown in FIG. 1.

FIG. 1 is a diagram showing one manner of distribution from collection to manufacturing and sales of battery assemblies in the present embodiment. A manner of distribution shown in FIG. 1 is referred to as a "battery distribution model" below. FIG. 2 is a flowchart showing a flow of processing in the battery distribution model shown in FIG. 1.

Referring to FIGS. 1 and 2, in the battery distribution model, used battery assemblies are collected from a plurality of vehicles each incorporating battery assemblies, and battery assemblies are manufactured from recyclable modules included in the collected battery assemblies and then sold. A battery assembly mounted on a vehicle 90 of a certain user is replaced.

A collection service provider 10 collects used battery assemblies from vehicles 91 to 93. Battery assemblies 910, 920, and 930 are mounted on vehicles 91, 92, and 93, respectively. Though FIG. 1 shows only three vehicles due to space restriction, battery assemblies are actually collected from a larger number of vehicles. Collection service provider 10 disassembles the collected battery assemblies and takes out a plurality of modules from the battery assemblies (step S1, hereinafter the step being abbreviated as "S").

In this battery distribution model, identification information (ID) for identifying a module is provided for each module, and a management server 80 manages information on each module. Therefore, collection service provider 10 transmits an ID of each module taken out of a battery assembly to management server 80 through a terminal device 71 (see FIG. 3).

A test service provider 20 tests performance of each module collected by collection service provider 10 (S2). Specifically, test service provider 20 tests characteristics of the collected module. For example, test service provider 20 tests such electrical characteristics as a full charge capacity, a resistance value, an OCV, and an SOC. Then, test service provider 20 classifies the modules into recyclable modules and non-recyclable modules based on results of the test, passes the recyclable modules to a reconditioning service provider 30 and the non-recyclable modules to a recycler 60. A test result of each module is transmitted to management server 80 through a terminal device 72 (see FIG. 3) of test service provider 20.

Reconditioning service provider 30 performs a process for reconditioning the module determined as recyclable by test service provider 20 (S3). By way of example, reconditioning service provider 30 restores a full charge capacity of the module by charging the module to an overcharged state. For a module determined as less in lowering in performance in the test by test service provider 20, the reconditioning process may be skipped. A result of reconditioning of each module is transmitted to management server 80 through a terminal device 73 (see FIG. 3) of reconditioning service provider 30.

A manufacturer 40 manufactures a battery assembly from modules reconditioned by reconditioning service provider 30 (S4). In the present embodiment, information (assembly information) for manufacturing a battery assembly is generated by management server 80 and transmitted to a terminal device 74 (see FIG. 3) of manufacturer 40. Manufacturer 40 manufactures (rebuilds) a battery assembly of vehicle 90 by replacing a module included in the battery assembly of vehicle 90 in accordance with the assembly information.

A dealer 50 sells the battery assembly manufactured by manufacturer 40 for vehicle use or for stationary use in a house or the like (S5). In the present embodiment, vehicle 90 is brought to dealer 50 and dealer 50 replaces the battery assembly of vehicle 90 with a reuse product or a rebuilt product manufactured by manufacturer 40.

Recycler 60 disassembles modules determined as being non-recyclable by test service provider 20 for reclamation for use as new cells or as source materials for other products.

Though collection service provider 10, test service provider 20, reconditioning service provider 30, manufacturer 40, and dealer 50 are service providers different from one another in FIG. 1, classification of the service providers is not limited as such. For example, a single service provider may serve as test service provider 20 and reconditioning service provider 30. Alternatively, collection service provider 10 may be divided into a service provider which collects battery assemblies and a service provider which disassembles collected battery assemblies. Locations of each service provider and each dealer are not particularly limited. Locations of each service provider and each dealer may be different or a plurality of service providers or dealers may be located at the same place.

Figure 3:
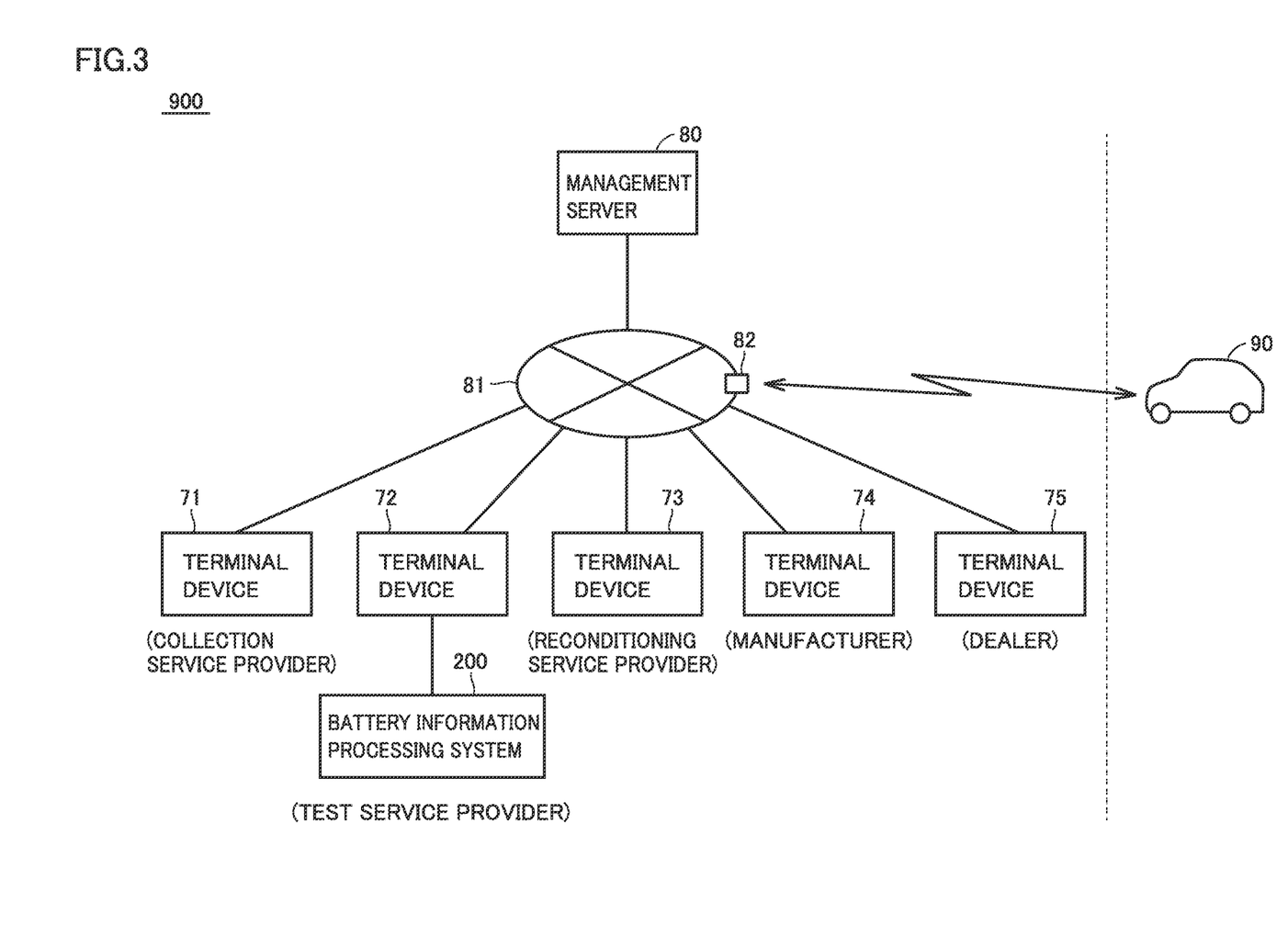
FIG. 3 is a diagram showing an exemplary configuration of a battery management system applied to the battery distribution model shown in FIG. 1.

FIG. 3 is a diagram showing an exemplary configuration of a battery management system applied to the battery distribution model shown in FIG. 1. Referring to FIG. 3, a battery management system 100 includes terminal devices 71 to 75, management server 80, a communication network 81, and a base station 82.

Terminal device 71 is a terminal device of collection service provider 10. Terminal device 72 is a terminal device of test service provider 20. Terminal device 73 is a terminal device of reconditioning service provider 30. Terminal device 74 is a terminal device of manufacturer 40. Terminal device 75 is a terminal device of dealer 50.

Management server 80 and terminal devices 71 to 75 are configured to communicate with one another through communication network 81 such as the Internet or telephone lines. Base station 82 on communication network 81 is configured to be able to transmit and receive information to and from vehicle 90 through wireless communication.

In test service provider 20, a battery information processing system 200 for measuring an AC impedance of each module and determining a manner of recycle (rebuild and resource recycle) of the module based on a result of measurement is provided. The manner of recycle of the module determined by battery information processing system 200 is transmitted to management server 80, for example, through terminal device 72.

A situation in which a manner of recycle of a certain module (which is denoted as a "module M") among a plurality of modules included in battery assembly 910 taken out of vehicle 91 is determined by battery information processing system 200 will be described below. Though an example in which a full charge capacity of module M is evaluated as a representative characteristic of module M is described, a characteristic of the module other than the full charge capacity (for example, an internal resistance) may be evaluated.

<Configuration of Battery Information Processing System>

Figure 4:
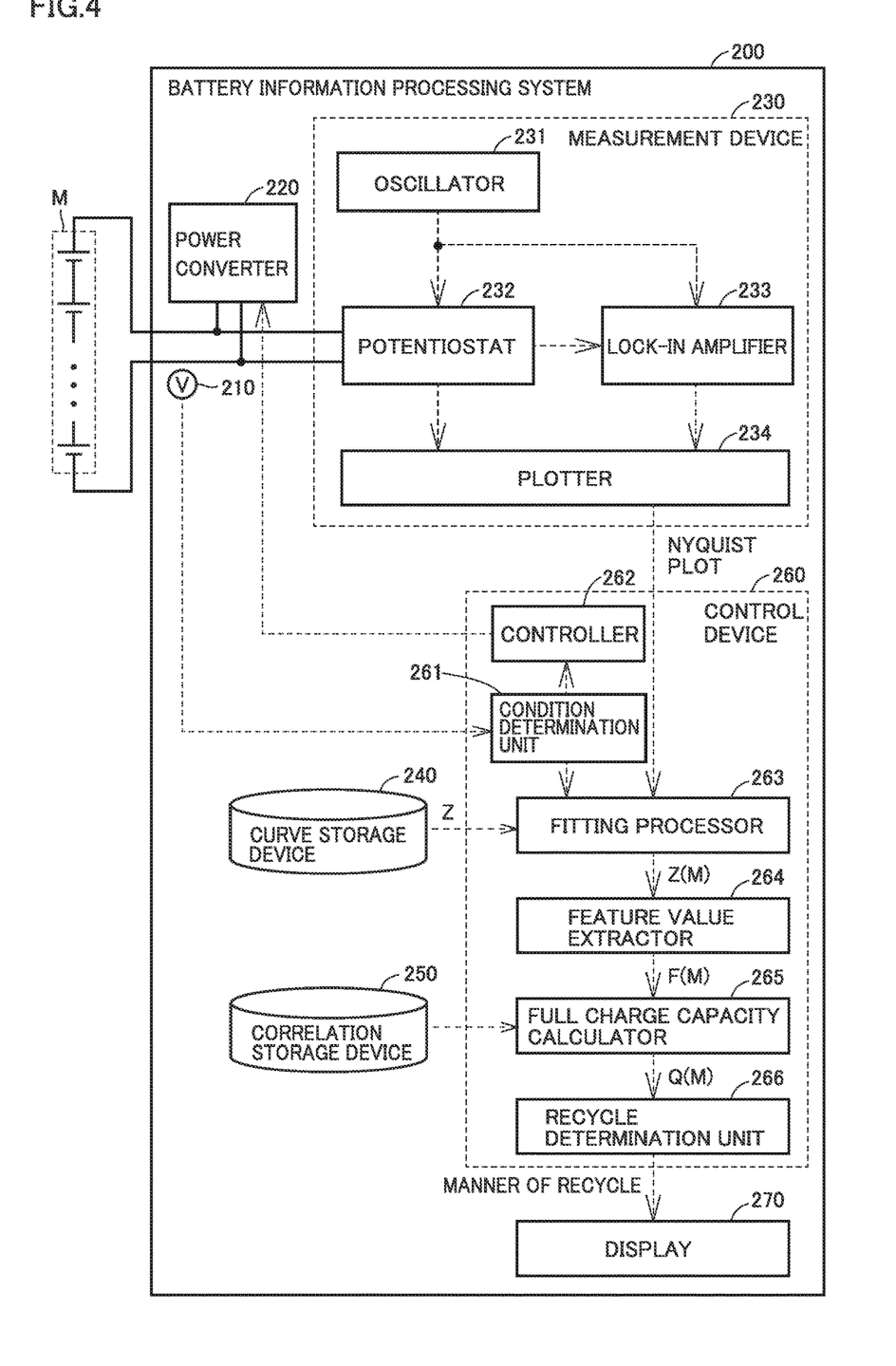
FIG. 4 is a diagram showing a configuration of a battery information processing system.

FIG. 4 is a diagram showing a configuration of battery information processing system 200. Battery information processing system 200 includes a voltage sensor 210, a power converter 220, a measurement device 230, a curve storage device 240, a correlation storage device display 250, a control device 260, and a display 270. These devices may be configured as devices independent of one another or integrated into a single device.

Voltage sensor 210 detects a closed circuit voltage (CCV) of module M and outputs a result of detection to control device 260.

Power converter 220 is implemented, for example, by a DC/DC converter or an AC/DC converter and converts electric power of module M in accordance with a control command from control device 260. More specifically, a not-shown power supply or load is electrically connected to power converter 220. Power converter 220 is configured to charge module M with electric power supplied from the power supply or discharge electric power stored in module M to the load. Power converter 220 corresponds to the "power converter" according to the present disclosure.

Measurement device 230 measures an AC impedance of module M and outputs a Nyquist plot representing a result of measurement to control device 260. More specifically, measurement device 230 includes an oscillator 231, a potentiostat 232, a lock-in amplifier 233, and a plotter 234.

Oscillator 231 outputs sinusoidal waves identical in phase to potentiostat 232 and lock-in amplifier 233.

Potentiostat 232 generates an application signal by superimposing a prescribed direct-current (DC) voltage on an AC voltage (for example, a voltage at an amplitude around 10 mV) identical in phase to sinusoidal waves from oscillator 231 and applies the generated application signal to module M. Then, potentiostat 232 detects a current which flows through module M and outputs a result of detection to lock-in amplifier 233 as a response signal from module M. Potentiostat 232 outputs the application signal and the response signal to plotter 234.

Lock-in amplifier 233 compares a phase of the sinusoidal waves received from oscillator 231 with a phase of the response signal detected by potentiostat 232 and outputs a result of comparison (a phase difference between the sinusoidal waves and the response signal) to plotter 234.

Plotter 234 plots a result of measurement of an AC impedance of module M on a complex plane based on a signal from potentiostat 232 (a signal indicating an amplitude ratio between the application signal and the response signal) and a signal from lock-in amplifier 233 (a signal indicating a phase difference between the application signal and the response signal). More specifically, a frequency of sinusoidal waves output from oscillator 231 is swept in a prescribed frequency range and processing described previously is repeatedly performed by potentiostat 232 and lock-in amplifier 233. Thus, results of measurement of an AC impedance of module M for each frequency of sinusoidal waves are plotted on the complex plane. This plot is called a Nyquist plot (which may also be called a Cole-Cole plot). The Nyquist plot of module M is output to control device 260.

The configuration of measurement device 230 is not limited to the configuration shown in FIG. 4. For example, though description that an AC voltage is applied to module M and a current which flows through module M at that time is detected has been given, potentiostat 232 may detect a voltage response at the time of application of an AC current to module M. Measurement device 230 may include a frequency response analyzer (not shown) instead of lock-in amplifier 233.

An approach below can also be adopted as an approach to measurement of an AC impedance. Specifically, an application signal (one of a voltage signal and a current signal) including various frequency components within a prescribed frequency range is generated, and a response signal (the other of the voltage signal and the current signal) at the time of application of the application signal is detected. Each of the application signal and the response signal is subjected to fast Fourier transform (FFT) for frequency decomposition, to thereby calculate an AC impedance for each frequency. A Nyquist plot can be created also by such an approach.

Though details will be described below with reference to FIGS. 5 to 11, in the present embodiment, a full charge capacity Q(M) of module M is calculated by constructing an equivalent circuit model representing frequency characteristics of an AC impedance of module M. More specifically, initially, a combined impedance of module M is expressed by a prescribed expression (an expression shown as an impedance curve Z(M) described below) including a plurality of circuit constants (model parameters) included in the equivalent circuit model. Then, impedance curve Z(M) is subjected to fitting processing such that an error from discrete actual measurement data shown on the Nyquist plot is sufficiently small. A value of each circuit constant which determines a combined impedance of module M is thus calculated.

Furthermore, a feature value F(M) is extracted from impedance curve Z(M) of module M in accordance with a predetermined arithmetic equation. Correlation between a feature value F and a full charge capacity Q of a module has been found in preliminary experiments conducted by the present inventors. Therefore, full charge capacity Q(M) of module M can be calculated from feature value F(M) of module M by extracting feature value F(M) from impedance curve Z(M) of module M and referring to correlation between feature value F and full charge capacity Q.

Curve storage device 240 stores an impedance curve Z. A predetermined initial value is set as a value of a circuit constant (see FIG. 9) included in impedance curve Z. Curve storage device 240 outputs impedance curve Z in which the initial value is set as the circuit constant to control device 260 in response to a request from control device 260.

Correlation storage device 250 stores correlation between feature value F and full charge capacity Q of a module, for example, as a function, a relational expression, or a table. Correlation storage device 250 is referred to by control device 260. Correlation storage device 250 corresponds to the "storage device" according to the present disclosure.

Though not shown, control device 260 is implemented, for example, by a microcomputer including a central processing unit (CPU), a memory, and an input/output port, and analyzes a Nyquist plot of module M obtained by measurement device 230. More specifically, control device 260 includes a condition determination unit 261, a controller 262, a fitting processor 263, a feature value extractor 264, a full charge capacity calculator 265, and a recycle determination unit 266.

Condition determination unit 261 determines whether or not a prescribed condition is satisfied upon receiving a result of detection by voltage sensor 210. The condition will be described in detail with reference to FIGS. 5 to 7. A result of determination by condition determination unit 261 is output to controller 262 and fitting processor 263.

Controller 262 controls charging and/or discharging of module M by outputting a control command in accordance with a result of determination by condition determination unit 261 to power converter 220.

Fitting processor 263 reads impedance curve Z stored in curve storage device 240 and performs fitting processing (curve regression) of impedance curve Z so as to be best applied to the Nyquist plot created by plotter 234. Values of a plurality of circuit constants (which will be described later) included in impedance curve Z are thus calculated and impedance curve Z(M) of module M is specified. Specified impedance curve Z(M) is output to feature value extractor 264.

Feature value extractor 264 extracts feature value F(M) from impedance curve Z(M) of module M by performing a prescribed operation on impedance curve Z(M). Extracted feature value F(M) is output to full charge capacity calculator 265.

Full charge capacity calculator 265 calculates a full charge capacity corresponding to feature value F(M) of module M by referring to correlation between feature value F and the full charge capacity stored in correlation storage device 250. Calculated full charge capacity Q(M) is output to recycle determination unit 266.

Recycle determination unit 266 determines a manner of recycle (rebuild or material recycle) of module M in accordance with full charge capacity Q(M) of module M. Recycle determination unit 266 may determine whether or not module M is recyclable. A result of determination by recycle determination unit 266 is output to display 270.

Display 270 is implemented, for example, by a liquid crystal display and shows a result of determination by recycle determination unit 266. Test service provider 20 can thus know how module M should be processed.

<Flow of Determination of Manner of Recycle>

In succession, a process flow for determining a manner of recycle of module M will be described in detail.

Figure 5:
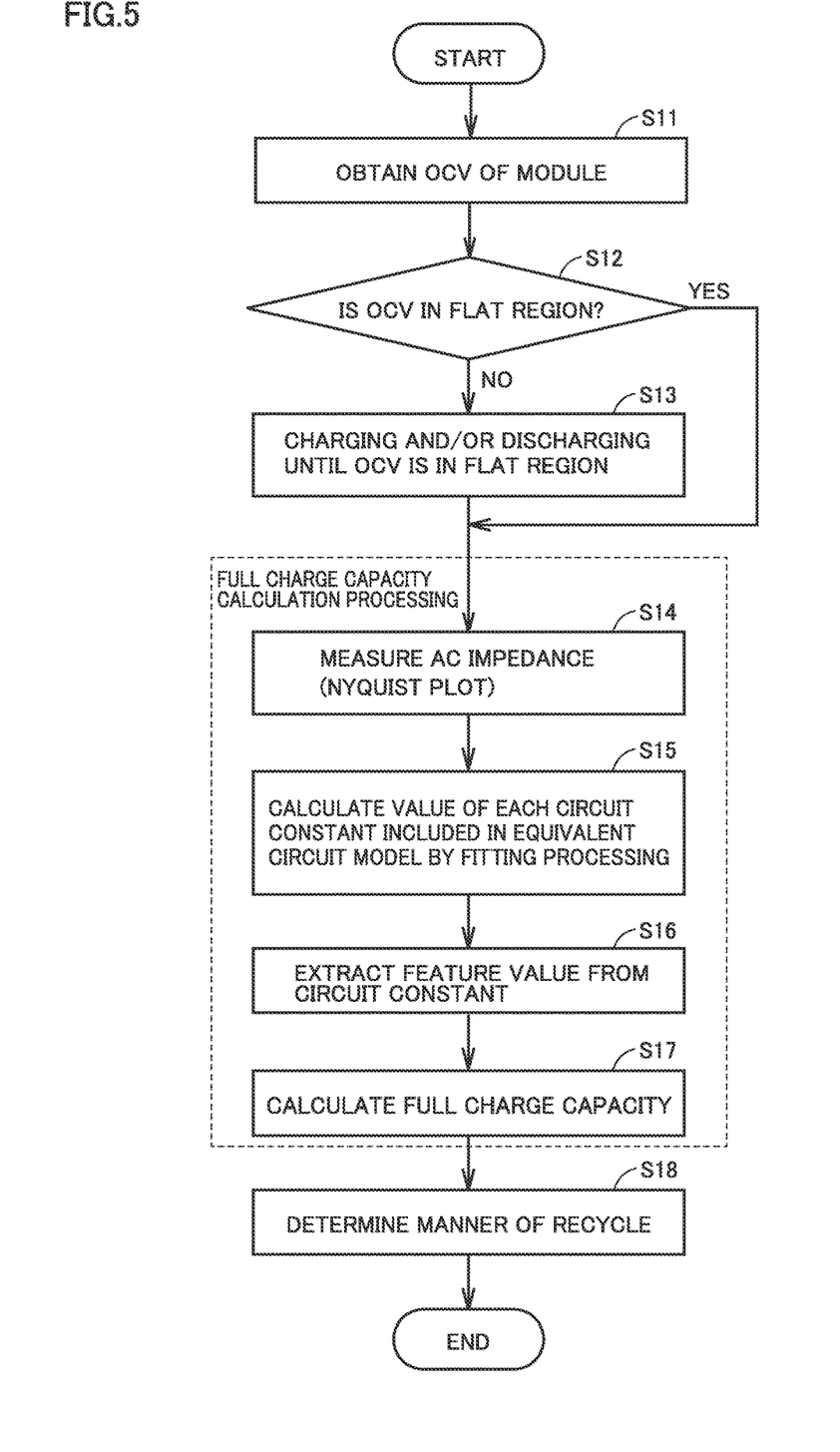
FIG. 5 is a flowchart showing processing for determining a manner of recycle of a module in the present embodiment.

FIG. 5 is a flowchart showing processing for determining a manner of recycle of module M in the present embodiment. This flowchart is executed by battery information processing system 200, for example, when test service provider 20 sets module M in battery information processing system 200 and operates a not-shown operation portion (such as a start button).

Components (such as plotter 234 of measurement device 230 or fitting processor 263 of control device 260) of battery information processing system 200 as an entity to perform each type of processing are not particularly distinguished below and they are comprehensively denoted as a "processing device 200." Though each step is basically performed by software processing by processing device 200, it may partly or entirely be performed by hardware (an electric circuit) provided in processing device 200.

In S11, processing device 200 obtains an OCV of module M. More specifically, processing device 200 obtains from voltage sensor 210, a voltage (CCV) of module M which was left stand for a prescribed period (for example, several ten minutes or longer) without being charged or discharged and thereby depolarized. Processing device 200 can set a value thus obtained as the OCV of module M.

In S12, processing device 200 determines whether or not the OCV of module M obtained in S11 is in the "flat region" which is a predetermined OCV region.

Figure 6:
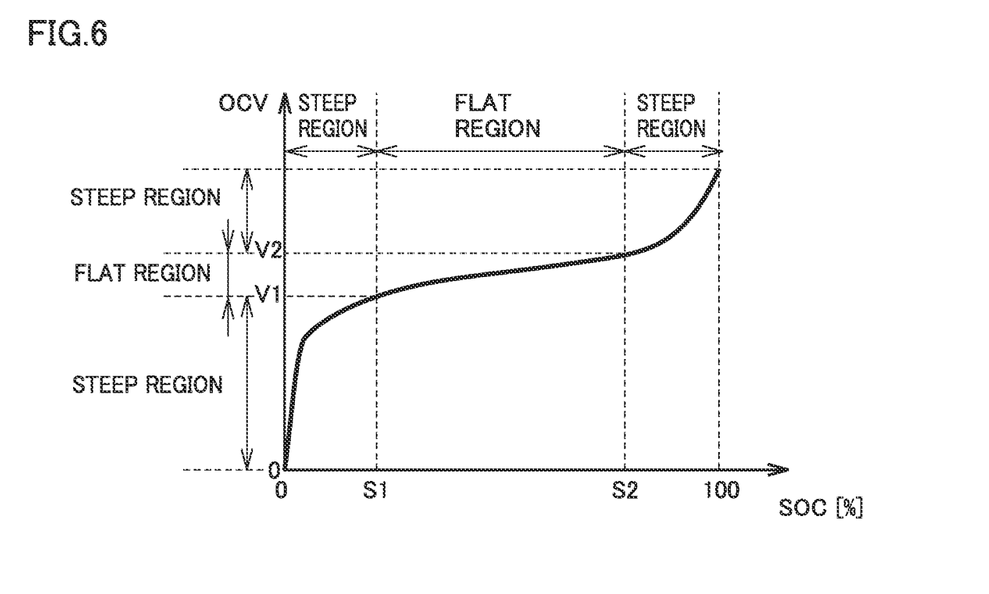
FIG. 6 is a diagram for illustrating a flat region of a module.

FIG. 6 is a diagram for illustrating a flat region of a module. In FIG. 6, the abscissa represents an SOC of the module and the ordinate represents an OCV of the module.

As shown in FIG. 6, there are a flat region and a steep region in an OCV-SOC curve of the module. The flat region refers to an OCV region where a ratio of variation representing an amount of increase in OCV with respect to an amount of increase in SOC of the module (a slope of a tangential line drawn on the curve) is not higher than a reference value. The steep region refers to an OCV region where the ratio of variation is higher than the reference value. In the example shown in FIG. 6, an OCV region expressed as $V1 \leq OCV \leq V2$ is defined as the flat region, and other OCV regions (a region expressed as $OCV < V1$ or $V2 < OCV$) are steep regions.

The OCV-SOC curve of the module monotonously increases and one-to-one correspondence is satisfied between the OCV and the SOC of the module. Therefore, by using an SOC instead of an OCV, an SOC region expressed as $S1 \leq SOC \leq S2$ may be defined as the flat region and SOC regions other than that ($0 \leq SOC < S1$, $S2 < SOC \leq 100$) may be defined as steep regions.

Figure 7:
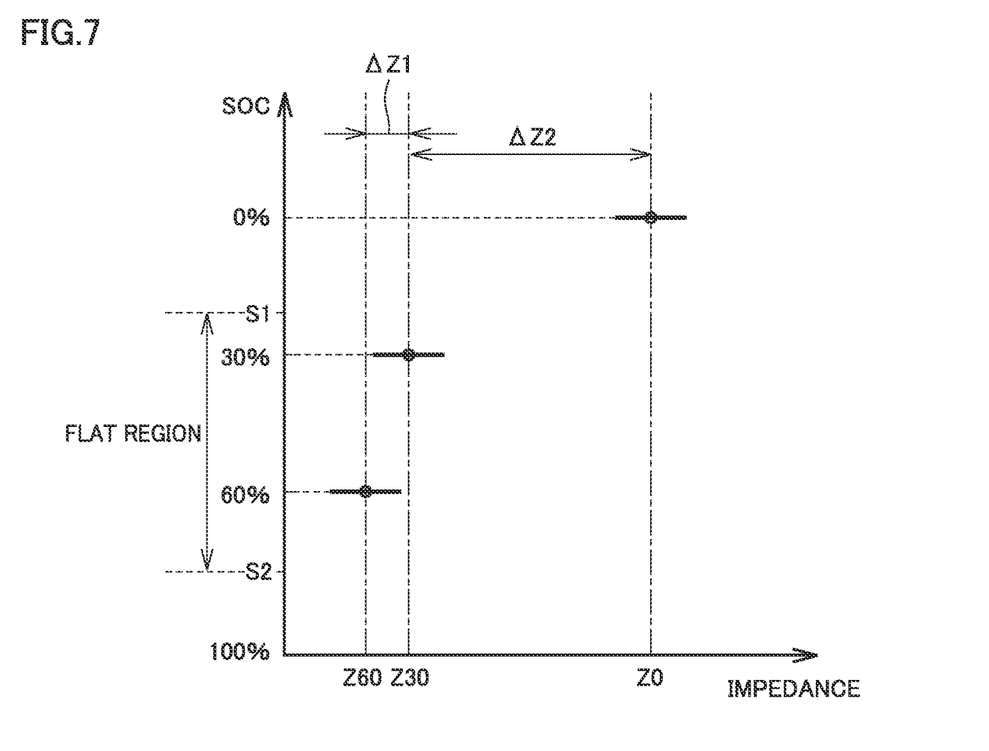
FIG. 7 is a diagram for illustrating influence on an AC impedance by an SOC of a module.

FIG. 7 is a diagram for illustrating influence on an AC impedance by an SOC of a module. In FIG. 7, the abscissa represents an AC impedance of the module at a certain frequency. The ordinate represents an SOC of the module. In view of correspondence between the SOC and the OCV, the ordinate may also be understood as an OCV of the module.

FIG. 7 shows an AC impedance at the time when a condition of SOC=0% is satisfied, an AC impedance at the time when a condition of SOC=30% is satisfied, and an AC impedance at the time when a condition of SOC=60% is satisfied. A crossbar provided on each AC impedance shown in the figure indicates a maximum value and a minimum value of the AC impedance. A white circle represents an average value of the AC impedance.

In the example shown in FIG. 7, SOC=0% is in the steep region and SOC=30% and 60% is in the flat region. A difference (denoted as ΔZ1) between an impedance Z30 corresponding to SOC=30% and an impedance Z60 corresponding to SOC=60%, both of which are in the flat region, is relatively small. In contrast, a difference (denoted as ΔZ2) between an impedance Z0 corresponding to SOC=0% in the steep region and impedance Z30 is greater than ΔZ1. This means that the AC impedance is substantially constant when the SOC (which may also be understood as the OCV) is in the flat region, whereas variation in AC impedance with variation in SOC is relatively great when the SOC is in the steep region.

Owing to such OCV dependency (SOC dependency) of the AC impedance, the present inventors have found that accuracy in calculation of a full charge capacity of module M is improved when such a condition as an OCV (which may be an SOC) of module M being in the flat region is satisfied. Based on this finding, processing device 200 determines whether or not an OCV of module M is in the flat region (in FIG. 6, a region expressed as V1≤OCV≤V2). Referring back to FIG. 5, when the OCV of module M is not in the flat region, that is, when the OCV of module M is in the steep region (NO in S12), processing device 200 has module M charged and/or discharged until the OCV of module M is within the flat region by controlling power converter 220 (S13). When the OCV of module M is in the flat region (YES in S12), processing in S13 is skipped.

Thereafter, in S14, processing device 200 measures an AC impedance of module M and obtains a Nyquist plot from a result of measurement. Since the approach to measurement of an AC impedance is described in detail in the description of the configuration of measurement apparatus 230 with reference to FIG. 4, description will not be repeated.

Figure 8:
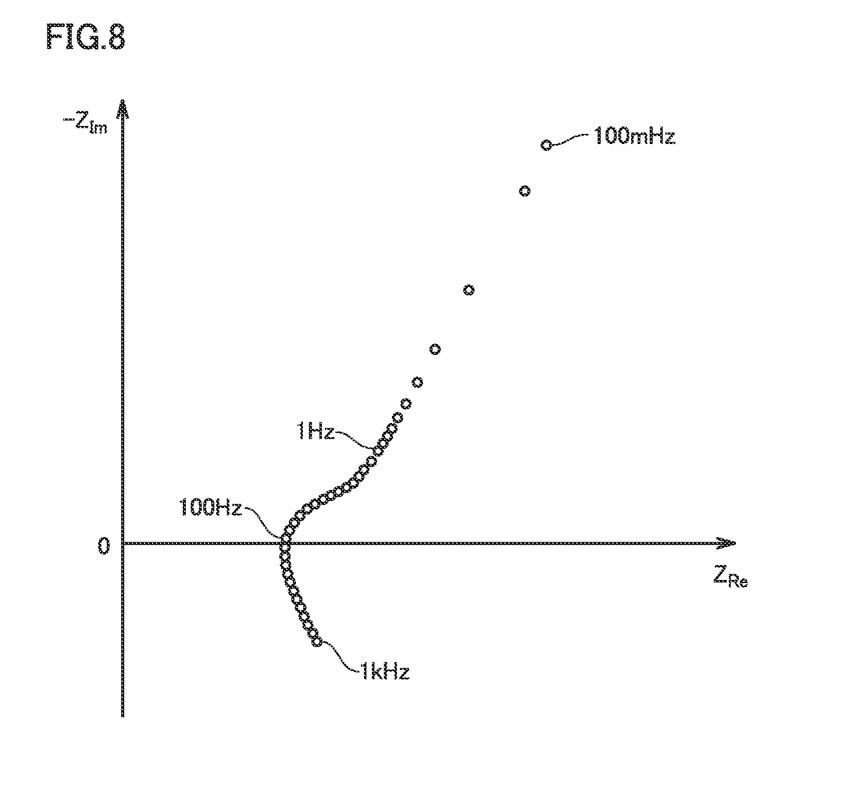
FIG. 8 is a diagram showing one example of a Nyquist plot of a result of measurement of an AC impedance of a module.
Figure 11:
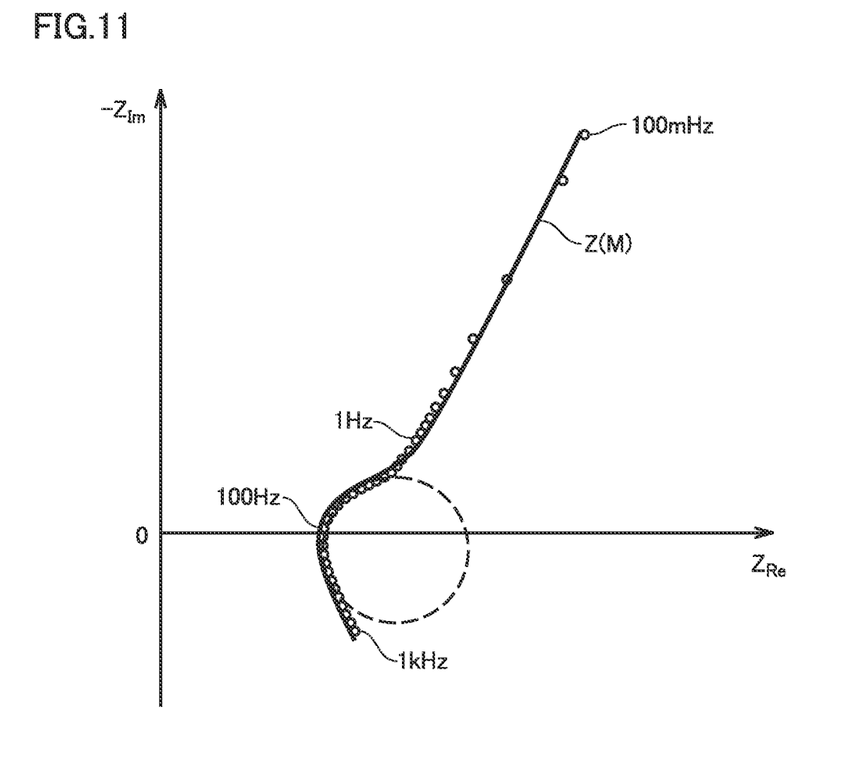
FIG. 11 is a diagram for illustrating an impedance curve obtained by fitting processing of the result of measurement of the AC impedance of the module shown in FIG. 8.

FIG. 8 is a diagram showing one example of a Nyquist plot of a result of measurement of an AC impedance of module M. In FIG. 8 and FIG. 11 which will be described later, the abscissa represents a real number component $Z_{Re}$ of a complex impedance of module M and the ordinate represents an imaginary number component $-Z_{Im}$ of the complex impedance of module M.

FIG. 8 shows one example of a result of measurement of an AC impedance when a frequency of an application signal is swept within a range from 100 mHz to 1 kHz. As shown in FIG. 8, the Nyquist plot results from plotting of a result of measurement of an AC impedance of module M in accordance with a frequency of the application signal as a discrete value on the complex plane.

Referring again to FIG. 5, in S15, processing device 200 performs fitting processing of impedance curve Z(M) of module M such that an error from the AC impedance of module M (a value measured in S14) is minimized, for example, by the non-linear least square method. Specifically, processing device 200 calculates, for each frequency of the application signal, a coordinate plotted (measured) at that frequency and a coordinate on impedance curve Z(M) corresponding to the frequency. Processing device 200 calculates a square of a distance (an error) between these coordinates for all frequencies of the application signal and totals the calculated values. Processing device 200 calculates a square sum of errors and adjusts a value of a circuit constant included in an equivalent circuit model so as to minimize the square sum of the errors. As a result of adjustment of such a circuit constant, the circuit constant is converged to satisfy a prescribed condition, so that impedance curve Z(M) is specified.

Figure 9:
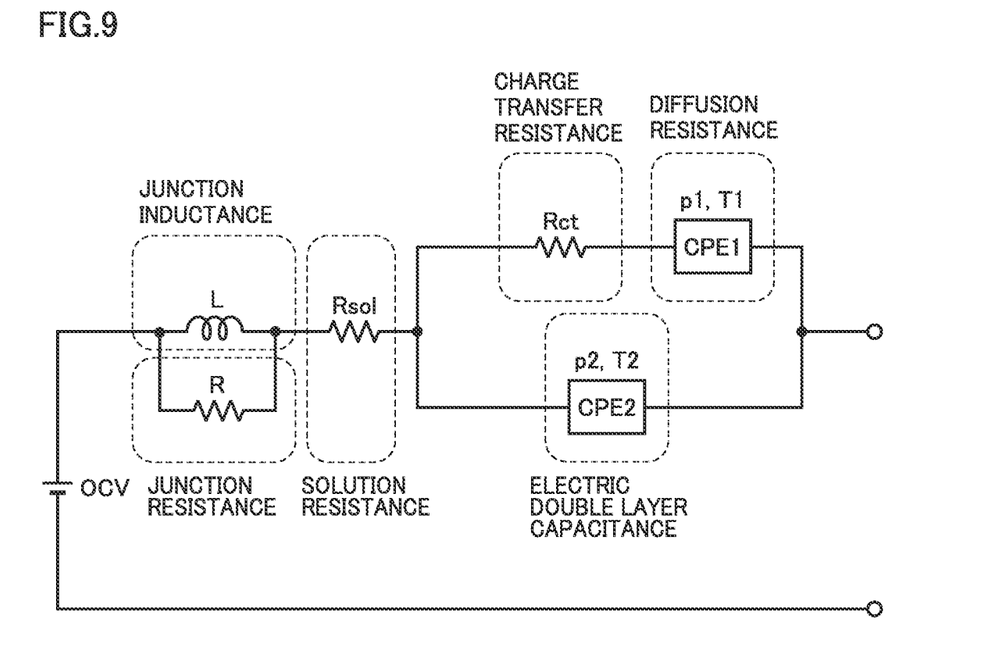
FIG. 9 is a diagram showing an equivalent circuit model of a module in the present embodiment.
Figure 10:
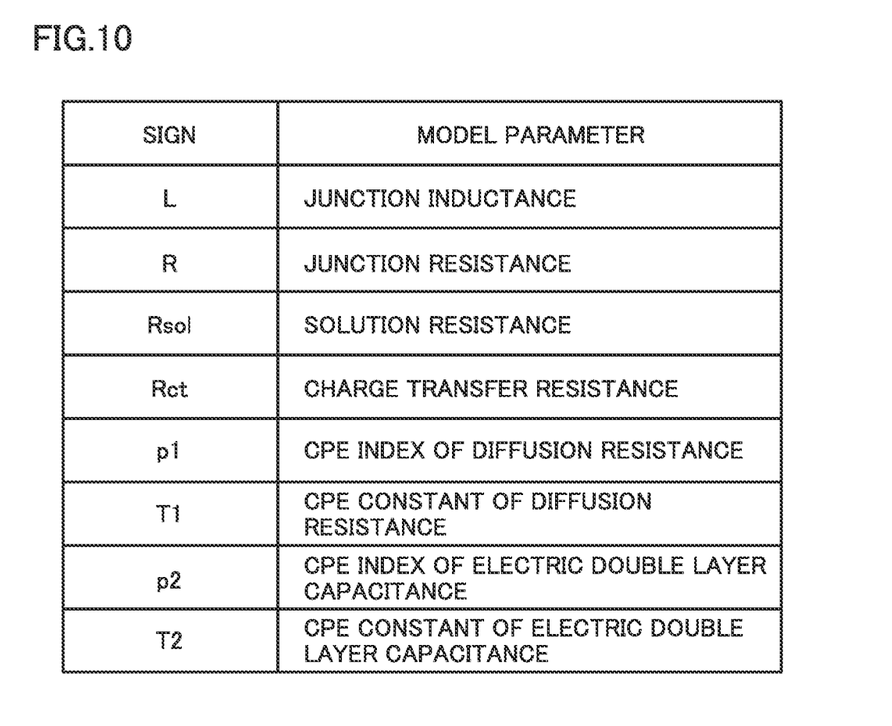
FIG. 10 is a diagram for illustrating a circuit constant included in the equivalent circuit model shown in FIG. 9.

FIG. 9 is a diagram showing an equivalent circuit model of a module in the present embodiment. FIG. 10 is a diagram for illustrating a circuit constant included in the equivalent circuit model shown in FIG. 9. Referring to FIGS. 9 and 10, in the present embodiment, an equivalent circuit model representing a frequency characteristic of an AC impedance of a module includes as circuit constants, a junction inductance L, a junction resistance R, a solution resistance Rsol, a charge transfer resistance Rct, a diffusion resistance (denoted as CPE1), and an electric double layer capacitance (denoted as CPE2).

Junction inductance L refers to an inductance component in a portion of junction between cells included in a module (a portion of junction between the positive electrode and the negative electrode). Junction resistance R refers to a resistance component in the junction portion. Solution resistance Rsol refers to a resistance component of an electrolyte solution present between the positive electrode and the negative electrode. Charge transfer resistance Rct refers to a resistance component relating to transfer of charges (supply and reception of charges) at an electrode/electrolyte interface (surfaces of a positive electrode active material and a negative electrode active material). The diffusion resistance refers to a resistance component relating to diffusion of a charge transfer material in salt or an active material in the electrolyte solution. The electric double layer capacitance refers to a capacitance component of an electric double layer formed at an electrode/electrolyte solution interface. Each of these circuit constants results from combination of corresponding components in all cells in the module.

Junction inductance L and junction resistance R are connected in parallel to each other. Solution resistance Rsol is connected in series to a parallel circuit of junction inductance L and junction resistance R. Charge transfer resistance Rct and the diffusion resistance are connected in series to each other. A series circuit of charge transfer resistance Rct and the diffusion resistance and the electric double layer capacitance are connected in parallel to each other. A combined circuit including junction inductance L, junction resistance R, and solution resistance Rsol and a combined circuit including charge transfer resistance Rct, the diffusion resistance, and the electric double layer capacitance are connected in series to each other. In the present embodiment, in order to appropriately express a capacitive behavior of module M, each of the diffusion resistance and the electric double layer capacitance of the module is expressed by a non-linear element called a constant phase element (CPE). More specifically, an impedance $Z_{CPE1}$ corresponding to the diffusion resistance is expressed as shown in an expression (1) below with a CPE index p1 and a CPE constant T1. In the expression (1), an angular frequency of an AC signal applied to the module (application signal) is denoted as ω (ω=2πf).

$$Z_{CPE1}=1/\{(j\omega)^{p1} \times T1\} \quad (1)$$

Similarly, an impedance $Z_{CPE2}$ corresponding to the electric double layer capacitance can also be expressed as shown in (2) below with a CPE index p2 and a CPE constant T2.

$$Z_{CPE2} = 1/\{(j\omega)^{p2} \times T2\} \quad (2)$$

In the present embodiment, an equivalent circuit model including eight circuit constants above is adopted. Impedance curve Z(M) corresponding to module M is specified (see S15 in FIG. 5) by fitting processing with the eight circuit constants being adopted as fitting parameters. The equivalent circuit model shown in FIGS. 9 and 10 is merely by way of example and another model may be adopted.

FIG. 11 is a diagram showing impedance curve Z(M) obtained by fitting processing of the result of measurement of the AC impedance of module M shown in FIG. 8. FIG. 11 shows with a bold line, a curve representing impedance curve Z(M) specified by fitting processing.

Processing device 200 substitutes an initial value (a predetermined value) of each of the eight circuit constants shown in FIG. 10 into impedance curve Z and repeats fitting processing, for example, by the non-linear least square method until a prescribed convergence condition is satisfied (for example, a value representing a degree of fitting in fitting processing such as a chi-square value becomes lower than a criterion value). When the convergence condition in fitting processing is satisfied, processing device 200 specifies impedance curve Z(M) based on the eight converged circuit constants. A fitting algorithm is not limited to the least square method, and another algorithm (for example, maximum likelihood estimation) can also be adopted.

In succession, processing device 200 allows the process to proceed to S16 shown in FIG. 5 and extracts feature value F(M) from impedance curve Z(M) of module M.

Which feature value should be extracted to establish correlation between the feature value and full charge capacity Q of the module is confirmed in advance in experiments conducted by the present inventors. More specifically, relation between feature value F and full charge capacity Q (a full charge capacity measured by actual charging and/or discharging of the module) of a large number of modules is experimentally found. By way of example, correlation expressed by a linear function as in an expression (3) below is established between feature value F and full charge capacity Q (a being a number other than 0).

$$Q = a \times F + b \quad (3)$$

In S16, specific feature value F(M) of which correlation with full charge capacity Q(M) has been confirmed is extracted from impedance curve Z(M). Such feature value F(M) can be extracted from impedance curve Z(M), for example, by a statistic approach such as multiple regression analysis. In this multiple regression analysis, variables in consideration of a real number value and an imaginary number value on impedance curve Z(M) as well as kurtosis, skewness, and multicolinearity of each component such as an inclination of a tangential line at each frequency are used.

When feature value F(M) is extracted from impedance curve Z(M), processing device 200 calculates full charge capacity Q(M) of module M based on extracted feature value F(M) (S17).

Thereafter, processing device 200 determines a manner of recycle of module M in accordance with full charge capacity Q(M) of module M (S18). For example, processing device 200 calculates a capacity retention which represents a ratio ($=Q(M)/Q_0$) between current full charge capacity Q(M) of module M and an initial full charge capacity $Q_0$ (a value already known from specifications of module M) and compares the capacity retention with a prescribed reference value. When the capacity retention of module M is not lower than the reference value, processing device 200 determines that module M can be used for rebuild of a battery assembly, and when the capacity retention of module M is lower than the reference value, it determines that module M cannot be used for rebuild and should be resource recycled.

<Accuracy in Calculating Full Charge Capacity>

Accuracy in calculating a full charge capacity by a method of determining a manner of recycle of a module in the present embodiment will finally be described.

Figure 12:
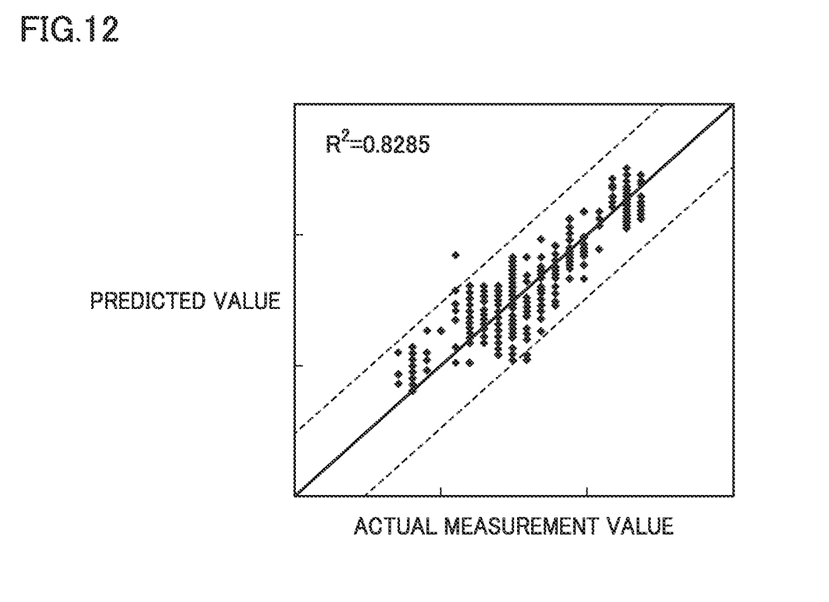
FIG. 12 is a diagram for illustrating accuracy in calculating a full charge capacity of a module in the present embodiment.

FIG. 12 is a diagram for illustrating accuracy in calculating a full charge capacity of a module in the present embodiment. The abscissa in FIG. 12 represents an actual full charge capacity of a module (which is a full charge capacity measured by actually charging and/or discharging a module and denoted as an "actual measurement value"). The ordinate represents a full charge capacity of a module calculated in the present embodiment (which is denoted as a "predicted value").

As shown in FIG. 12, according to the present embodiment, a correlation coefficient $R^2$ between the actual measurement value and the predicted value of the full charge capacity is 0.8285. It was thus confirmed that the actual measurement value and the predicted value of the full charge capacity sufficiently strongly correlated with each other. Since the full charge capacity denoted as the actual measurement value was highly accurately measured with time being spent, it can be concluded that a full charge capacity of a module can highly accurately be calculated also according to the present embodiment.

As set forth above, in the present embodiment, whether or not an OCV of module M is in the flat region is determined. OCV dependency of an AC impedance of module M is lower when the OCV is in the flat region than when the OCV is in the steep region. Therefore, even though the process proceeds to measurement of an AC impedance of module M (see S14 in FIG. 5) without charging and/or discharging of module M for precisely adjusting an OCV of module M, a result of measurement of an AC impedance not dependent on OCV of module M can be obtained. Thus, according to the present embodiment, since variation in result of measurement of an AC impedance due to a difference in OCV of module M can be lessened, a full charge capacity of module M can highly accurately be estimated. According to the finding described in the present embodiment, charging and/or discharging for precisely adjusting an OCV of module M does not have to be performed. Therefore, time required for calculation of a full charge capacity (time required for performing a series of processes shown in FIG. 5) can also be shortened.

Though the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery information processing system which processes information for calculating a full charge capacity of a battery module including a plurality of nickel metal hydride batteries, the battery information processing system comprising:
   a voltage sensor configured to detect a voltage of the battery module; and
   a controller configured to perform capacity calculation processing for calculating the full charge capacity of the battery module,
   the capacity calculation processing being processing for calculating the full charge capacity of the battery module based on a fitting curve calculated by fitting processing of a Nyquist plot representing a result of measurement of an alternating current (AC) impedance of the battery module, there being a flat region and a steep region in an open circuit voltage (OCV)-state of charge (SOC) curve of the battery module, a ratio of variation representing an amount of increase in OCV with respect to an amount of increase in SOC of the battery module, the ratio in the flat region being lower than a reference value, and the ratio in the steep region being higher than the reference value, the controller being configured to estimate an OCV of the battery module from a result of detection by the voltage sensor and perform the capacity calculation processing when the estimated OCV is in the flat region.

2. The battery information processing system according to claim 1, the battery information processing system further comprising a storage device configured to store a correlation between a feature value to be extracted from the fitting curve and the full charge capacity, wherein the controller is configured to perform processing for extracting the feature value from the fitting curve and calculating the full charge capacity from the extracted feature value by referring to the correlation.

3. The battery information processing system according to claim 1, the battery information processing system further comprising a power converter configured to charge and discharge the battery module, wherein the controller is configured to perform the capacity calculation processing by controlling the controller such that the OCV of the battery module is within the flat region when the OCV estimated from the result of detection by the voltage sensor is in the steep region.

4. A battery assembly comprising:

a plurality of the battery modules of which full charge capacity has been calculated by the battery information processing system according to claim 1.

5. A battery module capacity calculation method of calculating a full charge capacity of a battery module including a plurality of nickel metal hydride batteries, there being a flat region and a steep region in an open circuit voltage (OCV)-state of charge (SOC) curve of the battery module, a ratio of variation representing an amount of increase in OCV with respect to an amount of increase in SOC of the battery module, the ratio in the flat region being lower than a reference value, the ratio in the steep region being higher than the reference value, the battery module capacity calculation method comprising:

estimating an OCV of the battery module from a result of detection by a voltage sensor;

obtaining a Nyquist plot representing a result of measurement of an alternating current (AC); and calculating the full charge capacity of the battery module based on a fitting curve calculated by fitting processing of the Nyquist plot when the OCV of the battery module estimated in the estimating an OCV is in the flat region.

6. A method of manufacturing a battery assembly, there being a flat region and a steep region in an open circuit voltage (OCV)-state of charge (SOC) curve of a battery module including a plurality of nickel metal hydride batteries, a ratio of variation representing an amount of increase in OCV with respect to an amount of increase in SOC of the battery module, the ratio in the flat region being lower than a reference value, the ratio in the steep region being higher than the reference value, the method comprising:

estimating an OCV of the battery module from a result of detection by a voltage sensor;

obtaining a Nyquist plot representing a result of measurement of an alternating current (AC) impedance of the battery module;

calculating a full charge capacity of the battery module based on a fitting curve calculated by fitting processing of the Nyquist plot when the OCV of the battery module estimated in the estimating an OCV is in the flat region; and manufacturing a battery assembly from a plurality of battery modules of which full charge capacity has been calculated in the calculating the full charge capacity.

7. The battery information processing system of claim 1, wherein, when the estimated OCV is in the steep region, the controller is configured to control the battery module to charge or discharge until the OCV of the battery module enters the flat region before performing the capacity calculation processing.

* * * * *